US010761064B2

(12) United States Patent
Zeroug

(10) Patent No.: US 10,761,064 B2
(45) Date of Patent: Sep. 1, 2020

(54) DETECTION AND CHARACTERIZATION OF THIN WEAK BEDDING PLANES IN HYDROCARBON-BEARING LAMINATED FORMATIONS

(71) Applicant: SCHLUMBERGER TECHNOLOGY CORPORATION, Sugar Land, TX (US)

(72) Inventor: Smaine Zeroug, Lexington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 333 days.

(21) Appl. No.: 15/765,460

(22) PCT Filed: Sep. 30, 2016

(86) PCT No.: PCT/US2016/054569
§ 371 (c)(1),
(2) Date: Apr. 2, 2018

(87) PCT Pub. No.: WO2017/059151
PCT Pub. Date: Apr. 6, 2017

(65) Prior Publication Data
US 2018/0306751 A1     Oct. 25, 2018

Related U.S. Application Data

(60) Provisional application No. 62/236,333, filed on Oct. 2, 2015.

(51) Int. Cl.
*G01N 29/04*     (2006.01)
*G01N 29/06*     (2006.01)
*G01N 29/46*     (2006.01)

(52) U.S. Cl.
CPC ........... *G01N 29/041* (2013.01); *G01N 29/06* (2013.01); *G01N 29/46* (2013.01); *G01N 2291/0231* (2013.01); *G01N 2291/103* (2013.01)

(58) Field of Classification Search
CPC ...... G01N 29/041; G01N 29/06; G01N 29/46; G01N 2291/0231; G01N 2291/103
See application file for complete search history.

(56) References Cited

U.S. PATENT DOCUMENTS 4,641,724 A * 2/1987 Chow ...................... G01V 1/44
181/104
4,799,200 A * 1/1989 Cheung .................... G01V 1/50
367/30

(Continued)

OTHER PUBLICATIONS

Chang, C-H. et al., "Experimental observation of surface wave propagation for a transversely isotropic medium", Geophysics, 1995, 60(1), pp. 185-190.
Chuprakov, D. et al., "Hydraulic Fracture Height Containment by Weak Horizontal Interfaces", SPE-173337, presented at the SPE Hydraulic Fracturing Technology Conference held in The Woodlands, Texas, USA, 2015, 17 pages.

(Continued)

*Primary Examiner* — Raymond L Nimox

(57) ABSTRACT

Methods are provided for making, processing, and analyzing in situ measurements to indicate presence of thin bedding planes of weakness in a formation. Bedding planes as small as a few inches and smaller are identified using an ultrasonic borehole tool. In one embodiment, detected pseudo-Rayleigh waveforms are processed to determine whether multiple events are detected. If so, lamination and a likely bedding plane of weakness are identified. In another embodiment, a sonic borehole tool is run in conjunction with the ultrasonic borehole tool. Indications of shear and pseudo-shear wave speeds are compared, and where different, a bedding plane of weakness is identified. In another embodiment, a microresistivity imager is run with the ultrasonic borehole tool, and at locations where multiple events (Continued)

are not detected, the image obtained by the imager is inspected to find locations of sharp contrast with adjacent locations to thereby identify bedding planes of weakness.

20 Claims, 16 Drawing Sheets

(56) References Cited

U.S. PATENT DOCUMENTS

| | | | |
|---|---|---|---|
| 4,831,600 A * | 5/1989 | Hornby | G01V 1/50 367/31 |
| 6,374,186 B1 | 4/2002 | Dvorkin et al. | |
| 6,510,389 B1 | 1/2003 | Winkler et al. | |
| 6,678,616 B1 * | 1/2004 | Winkler | G01V 1/44 181/104 |
| 6,718,266 B1 * | 4/2004 | Sinha | G01V 1/48 367/75 |
| 7,529,152 B2 * | 5/2009 | Sinha | G01V 1/50 367/31 |
| 8,681,582 B2 * | 3/2014 | Wu | G01V 1/50 367/14 |
| 2006/0256656 A1 * | 11/2006 | Sinha | G01V 1/50 367/31 |
| 2013/0289881 A1 | 10/2013 | Sinha | |
| 2015/0219780 A1 * | 8/2015 | Zeroug | E21B 47/0005 702/6 |
| 2018/0196157 A1 | 7/2018 | Zeroug et al. | |

OTHER PUBLICATIONS

Lim, T. C., et al., "Character of Pseudo Surface Waves on Anistropic Crystals", Journal of Acoust. Society of America, 1968, 45, pp. 845-851.

Miskimins, J. et al., "Modeling of Hydraulic Fracture Height Containment in Laminated Sand and Shale Sequences", SPE 80935, presented at the SPE Production and Operations Symposium, Oklahoma City, Oklahoma, USA, 2003, 11 pages.

Glaser, K. et al., "Seeking the Sweet Spot: Reservoir and Completion Quality in Organic Shales", Schlumberger Oilfield Review 25(4), Winter 2013/2014 pp. 16-29.

Suarez-Rivera, R. et al., "Understanding the Effect of Rock Fabric on Fracture Complexity for Improving Completion Design and Well Performance", IPTC 17018, presented at the International Petroleum Technology Conference held in Beijing, China, 2013, 9 pages.

Van Kuijk, R., "A Novel Ultrasonic Cased-Hole Imager for Enhanced Cement Evaluation", International Petroleum Technology Conference (IPTC), Doha, Qatar, 2005, 14 pages.

Zeroug, S., "Pulsed Beam Excitation of Leaky Rayleigh Waves on Shaped Fluid-Solid Interfaces", IEEE Ultrasonic Symposium Proceedings, 1994 2, pp. 1091-1094.

Zeroug, S. et al., "Ultrasonic Leaky-Lamb Wave Imaging Through a Highly Contrasting Layer", 2003 IEEE Symposium on Ultrasonics, 2003, 1, pp. 794-798.

"Borehole Imaging", Sonatrach-Schlumberger Well Evaluation Conference, Algeria, 2007, pp. 3.28-3.65, published by Schlumberger 2007.

* cited by examiner

DETECTION AND CHARACTERIZATION OF THIN WEAK BEDDING PLANES IN HYDROCARBON-BEARING LAMINATED FORMATIONS

RELATED APPLICATIONS

This application claims the benefit of U.S. Provisional Application Ser. No. 62/236,333 filed on Oct. 2, 2015, which is hereby incorporated by reference herein in its entirety.

TECHNICAL FIELD

The subject disclosure relates to methods and systems for investigating subsurface formations using measurements made in a borehole. More particularly, the subject disclosure relates to the detection and/or characterization of thin bedding planes in a formation, although it is not limited thereto.

BACKGROUND

The production of hydrocarbons from a tight "unconventional" formation such as tight shale/sand and siltstone/sand/carbonate often requires a hydraulic fracturing of the rock of the formation. A typical completion process involves the use of fracturing techniques in a horizontal well that are intended to "open" the formation rock above and below the well. The fracturing is intended to generate access to as much area of the hydrocarbon-bearing reservoir in the formation as possible. Optimal completion design and execution depends on a knowledge of mechanical properties of these formations.

Tight shale/sand or siltstone/sand/carbonate formations are made of sequences of layers of stiff mineral constituents in contact with layers of compliant organic and/or clay constituents. The thickness of these layers can be as large as a few feet and as thin as a fraction of an inch.

It is believed that laminated beds, occurring mainly horizontally, affect fracture growth patterns, and these effects are expressed particularly in fracture vertical height containments. See J. Miskimins and R. D. Barree, "Modeling of Hydraulic Fracture Height Containment in Laminated Sand and Shale Sequences," SPE 80935, 2003, and D. Chuprakov and R. Prioul, "Hydraulic Fracture Height Containment by Weak Horizontal Interfaces," SPE-173337, 2015. Arresting of hydraulic fractures at interfacial planes of weakness has also been studied and documented through laboratory studies. See Suarez-Rivera R. et al., "Understanding the effects of rock fabric on fracture complexity for improving completion design and well performance," IPTC 17018, Beijing China, 2013.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, in situ measurements are made that may be analyzed or processed to indicate the presence of a bedding plane of weakness in a formation. In embodiments, bedding planes as small as just a few (e.g., three) inches and smaller may be identified through analysis or processing of in situ measurements.

According to another aspect, in situ measurements that are made may be analyzed or processed to quantify mechanical properties that are pertinent to hydraulic fracturing.

In one embodiment, an ultrasonic borehole tool is used in a pitch-catch mode in an uncased borehole traversing a formation in order to excite and detect pseudo-Rayleigh surface waves in the borehole. The waveforms associated with the detected pseudo-Rayleigh waves are processed and/or analyzed to determine whether or not at least two events are represented. If at least two events are present (e.g., the received signal suggests a split in the signal), it is concluded that the investigated rock is laminated at the inch or sub-inch scale. As a result, it may also be concluded that the rock presents a plane and/or interface of weakness for hydraulic fracturing.

In some embodiments, the calculated time delay between the two events is used to indicate the extent of mechanical weakness of the plane and/or interface of weakness with increased delay indicating increased weakness. Various embodiments of the present disclosure have particular application to unconventional formations made of tight shale/sand or siltstone/sand/carbonate, although the embodiments are not limited thereto.

In another embodiment, both an ultrasonic borehole tool and a sonic borehole tool are run in an uncased borehole, with the ultrasonic borehole tool being used in a pitch-catch mode with the transducers aligned at angles that favor the excitation and detection of pseudo-Rayleigh surface (pseudo-S) waves in the borehole. The sonic tool generates and detects shear (S) and compressional (P) waves. Wave slowness (e.g., speed, velocity, or slowness) information from the pseudo-S is then estimated from the early-arriving part of the detected signal, and compared to the S from the sonic. Wave slowness from the ultrasonic compressional and the sonic compressional is also compared. Where the information provides (i) a disparity between the pseudo-S slowness and the S slowness (e.g., with the pseudo-S slowness being smaller than the S slowness) and (ii) agreement between the compressional slownesses, it is concluded that the investigated rock is laminated at the inch or sub-inch scale. As a result, it may also be concluded that the rock presents a plane and/or interface of weakness for hydraulic fracturing.

In one embodiment, the difference in slowness or velocity as calculated from the received waveforms is used to indicate the extent of mechanical weakness of the plane and/or interface of weakness with an increased difference indicating increased weakness. Various embodiments of the present disclosure have particular application to unconventional formations made of tight shale/sand or siltstone/sand/carbonate, although the embodiments are not limited thereto.

In another embodiment, an ultrasonic borehole tool is used in a pitch-catch mode in an uncased borehole traversing a formation in order to excite and detect pseudo-Rayleigh surface wave (pseudo-S) waves in the borehole (and compressional (P) waves if desired), and a micro-resistivity tool is also used in the borehole in order to acquire signals and generate resistivity images. Where the pseudo-S waveforms do not show multiple events, resistivity images, and in particular, resistivity images that have been modified with a dynamic scaling of the resistivity amplitude may be utilized to locate planes or interfaces of highly-contrasted rock compliance, if present. The resistivity images may be visually contrasted and/or quantitatively correlated with slowness images generated from the ultrasonic borehole tool results.

Any of the method embodiments discussed above can be implemented using a system with a logging tool (e.g., ultrasonic, sonic, and/or microresistivity) and a processing system.

Additional aspects, embodiments, objects and advantages of the disclosed methods may be understood with reference to the following detailed description taken in conjunction with the provided drawings.

DETAILED DESCRIPTION

The term "slowness" as used in the claims and the present disclosure includes both slowness values (e.g., time per distance) and reciprocal values, such as wavespeed values and wave velocity values (e.g., distance per time). It should be understood that either slowness values or wavespeed values can be used to identify lamination at the inch/sub-inch scale, in accordance with the methods described herein. Furthermore, the terms "wave velocity", "wavespeed", and "wave slowness" are to be understood to include the other terms when used in the claims and the present disclosure.

Figure 1A:
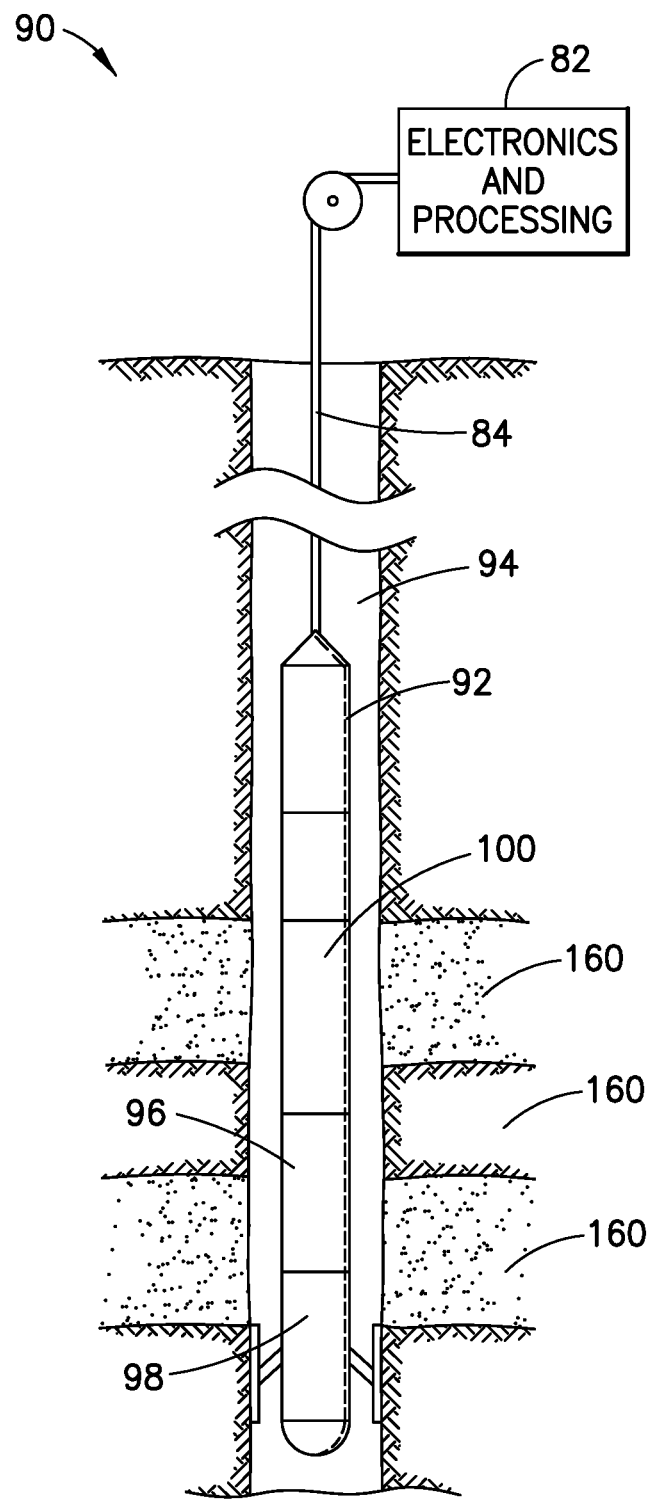
FIG. 1a shows a borehole logging system.

The ultrasonic data, sonic data, and/or microresistivity data used by the methods described herein can be acquired using a borehole logging system, such as a wireline logging system or a logging-while-drilling (LWD) system. FIG. 1a shows an example of a borehole logging system 90 that can be used to acquire data that characterizes a formation. In this example, the borehole logging system 90 is a wireline logging system. The wireline logging system 90 includes a wireline tool 92 that is disposed within a borehole 94 that traverses a formation 160. The wireline tool 92 includes an ultrasonic tool 100 used to make ultrasonic measurements of the formation and to collect ultrasonic data about the formation. The ultrasonic tool 100 excites and detects pseudo-Rayleigh surface wave waveforms and ultrasonic compressional wave waveforms in the borehole. Further details regarding the ultrasonic tool are provided in FIGS. 1b and 1c. The wireline tool 92 may also include other tools. For example, in FIG. 1a, the wireline tool 92 also includes a sonic tool 96 with at least one sonic transmitter and a plurality of sonic receivers. The sonic tool 96 is used to make sonic measurements of the formation 160 and collect sonic data. The sonic tool 96 excites and detects sonic shear wave waveforms and sonic compressional wave waveforms in the borehole. The wireline tool 92 may further include a microresistivity tool 98 with pads and electrodes disposed on the electrodes. The microresistivity tool makes resistivity measurements of the formation 160 and collects microresistivity data that can be used to form an image of the borehole. The wireline tool 92 is coupled to a processing system 82 via a wireline 84. The processing system 82 is located at a surface location. Signals and data that are acquired by the wireline tool 92 are sent from the wireline tool uphole for processing and analysis by the processing system.

Figure 1B:
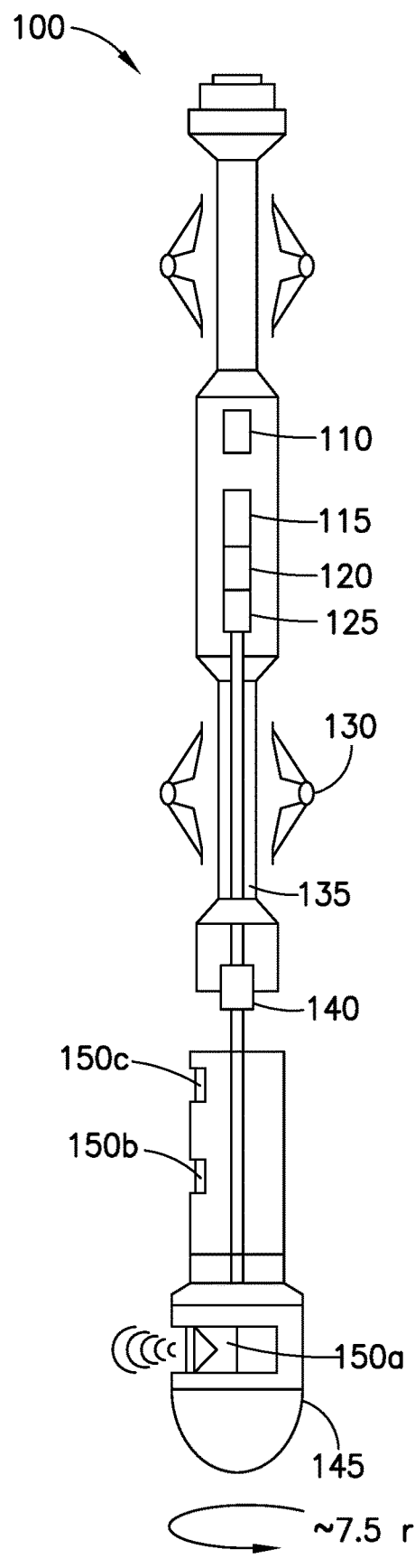
FIG. 1b is a diagram of an ultrasonic tool.
Figure 1C:
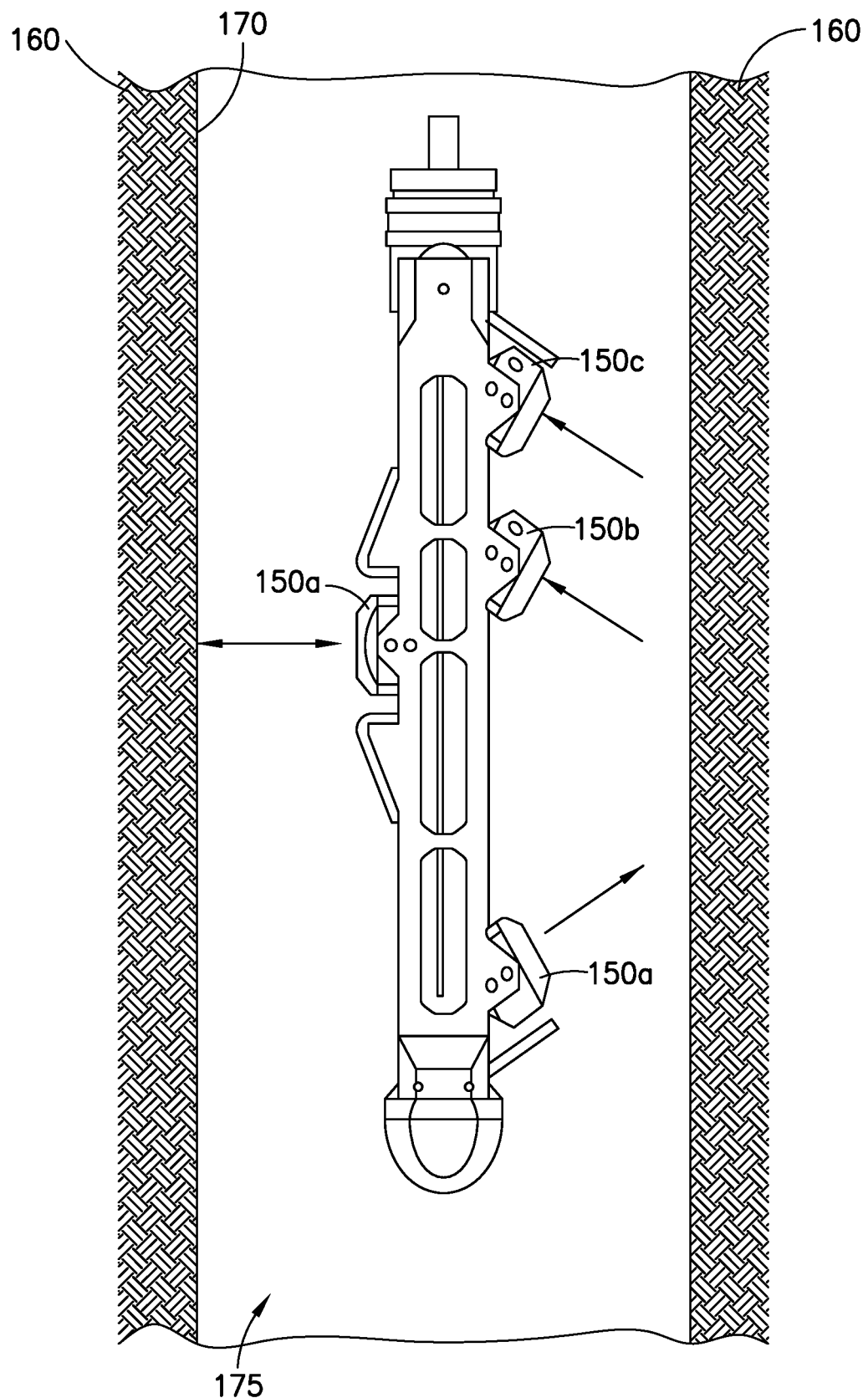
FIG. 1c shows the ultrasonic tool of FIG. 1b in a borehole traversing a formation and with a rotating subassembly arranged in a pitch-catch modality.

Turning to FIG. 1b and FIG. 1c, a schematic of an ultrasonic tool 100 is shown. An example of an ultrasonic tool is the Isolation Scanner (a trademark of Schlumberger). The Isolation Scanner tool was originally developed for cement evaluation in cased holes. See S. Zeroug and B. Froelich, "Ultrasonic leaky-lamb wave imaging through a highly contrasting layer," 2003 IEEE Symposium on Ultrasonics, pages 794-798, Vol. 1., 2003, and R. van Kuijk, SPE, S. Zeroug, B. Froelich, M. Allouche, S. Bose, D. Miller, J.-L. le Calvez, V. Schoepf, and A. Pagnin; "A Novel Ultrasonic Cased-Hole Imager for Enhanced Cement Evaluation", International Petroleum Technology Conference (IPTC), 21-23 Sep. 2005, Doha, Qatar. In some embodiments, the ultrasonic tool 100 includes communications electronics 110, a motor assembly 115, a gear box assembly 120, a rotating electrical connection 125, a centralizer 130, a rotating shaft with built-in electronics 135, a rotating seal 140, a rotating subassembly 145, an ultrasonic transducer 150a, and ultrasonic receivers 150b, 150c. The rotating subassembly 145 houses the transducer 150a and receivers 150b, 150c.

In one embodiment, the ultrasonic transducer 150a may operate in different modes. In one mode, the transducer 150a may operate in a pulse-echo mode where the transducer generates pulses and detects echoes from the reflections of the pulses at the borehole wall 170 as the subassembly rotates (as suggested by one transducer 150a of FIG. 1b). The travel time and amplitude of the echo may be estimated and displayed as an image as a function of azimuth, thereby providing images of the geometry of the borehole and acoustic contrast between borehole fluid and rock. See "Borehole Imaging," in Sonatrach-Schlumberger Well Evaluation Conference—Algeria 2007, pp. 3.28-3.65 published by Schlumberger, 2007).

In a second mode of particular interest, the ultrasonic transducer 150a may operate in a pitch-catch mode in conjunction with receivers 150b, 150c as suggested with respect to another transducer 150a of FIG. 1b. In the pitch-catch mode, a transmitting transducer 150a is used to inject acoustic energy into the rock 160 at an angle with respect to a normal to the borehole wall 170, while two receiving transducers (near receiver 150b and far receiver 150c) collect the acoustic energy that is released by the rock back into the borehole fluid 175. The transit times of the collected acoustic waveforms provide an estimation of the speeds of the waves that can propagate in the rock along the direction of the borehole.

Because of the high-frequency content of ultrasonic signals, the transmitter 150a emits collimated acoustic beams while the receivers 150b, 150c, by reciprocity, collect in a collimated fashion with their finite apertures. The excitation of waves that sample the near-wellbore and their detection occur most efficiently when the transmitting and receiving transducers (and hence their acoustic beams) are aligned at two specific angles associated with the compressional (P) and shear (S) waves, respectively, that can propagate in a near wellbore zone in the presence of borehole fluid. By way of example only, transducer 150a may be angled at a small angle (such as 15 degrees) with respect to the normal to the borehole wall so that the energy will generate a compressional (P) wave in the formation, and at a larger angle (such as 28 degrees) with respect to the normal to the borehole wall in order to generate a shear (S) wave. When the transducers are aligned at the critical angle of the compressional wave, the incident acoustic beam is specifically coupled to the compressional headwave. This wave behaves in consistency with the known compressional headwave of the much-lower frequency sonic (monopole) measurement. On the other hand, when the transducers are aligned at the critical angle of the shear wave, the incident acoustic beam is specifically coupled to the shear headwave and to a pseudo-Rayleigh surface wave. Rayleigh surface waves occur at an interface between air and a solid. The term "pseudo" is used because in the present case air is replaced by a liquid (e.g., borehole fluid). It is known that in a homogenous layer, the pseudo-Rayleigh surface wave propagates at a slightly lower rate than the shear headwave but with amplitudes that overwhelm the shear headwave. See, e.g., Viktorov, I. A., *Rayleigh and Lamb Waves*, New York, Plenum Press, (1967), and Zeroug S., "Pulsed beam excitation of leaky Rayleigh waves on shaped fluid-solid interfaces," *IEEE Ultrason. Symp., Proceed.*, 1994 (Vol. 2) pp. 1091-1094).

Figure 2:
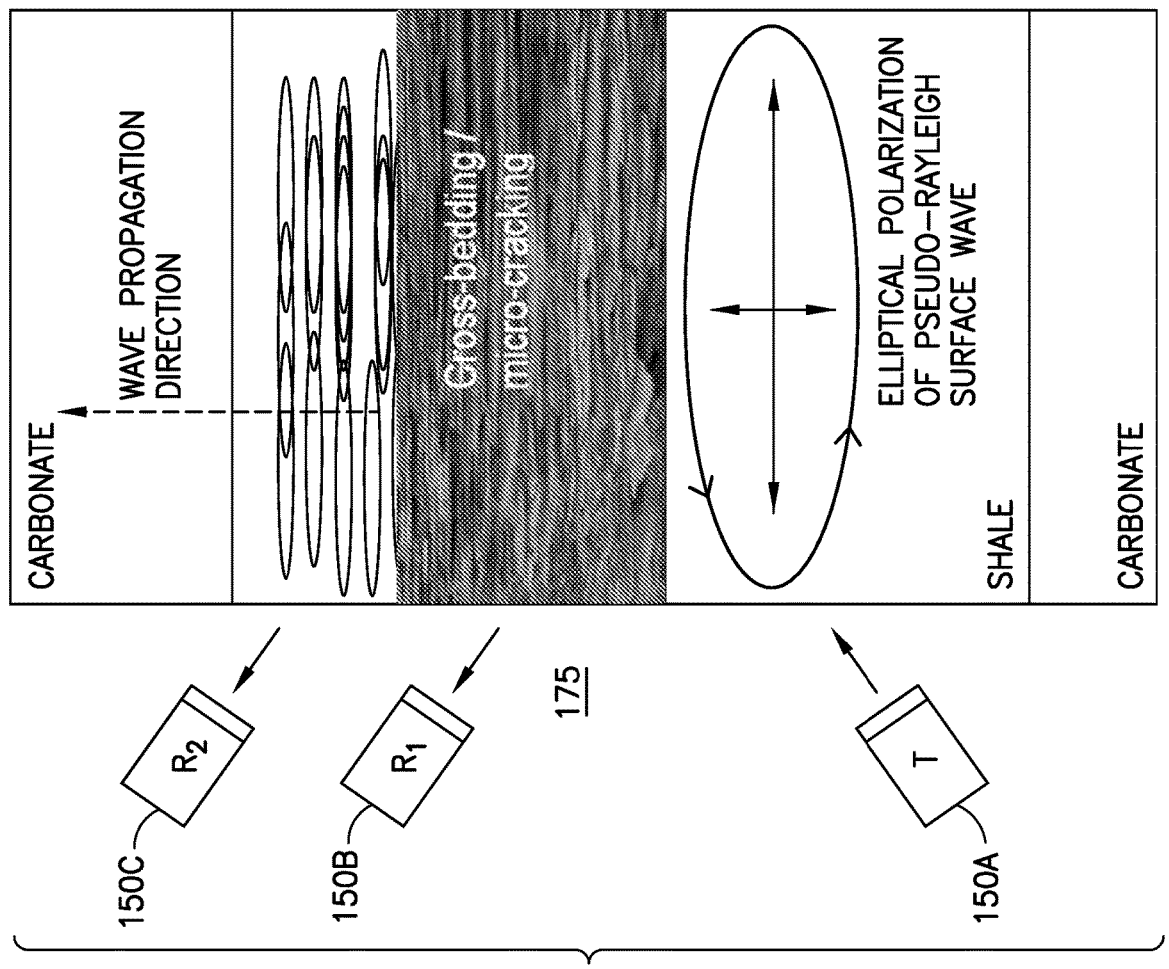
FIG. 2 is a diagram suggesting the elliptical polarization of a pseudo-Rayleigh surface wave generated by the ultrasonic tool of FIG. 1b.

In one aspect, slowness determinations and velocity images are estimated from the signals obtained by the ultrasonic tool receivers. These determinations and images are based on a difference in time of arrivals at the respective receivers where the transit time is estimated, for example, from a first break detection scheme on the corresponding P-wave or pseudo-Rayleigh wave. In this disclosure, the slowness or velocity data estimated from the pseudo-Rayleigh surface wave signals may also be referred to as pseudo-shear slowness or pseudo-shear velocity so as to distinguish it from the shear slowness or shear velocity estimated from the sonic shear head wave signals. As depicted in FIG. 2, in a homogeneous layer of the formation 160, the pseudo-Rayleigh surface wave subjects particles to a retrograde elliptical motion with its major axis perpendicular to the fluid-rock surface. Thus, in FIG. 2, the ultrasonic transducer 150a and receivers 150b, 150c are depicted as being in borehole fluid 175, and the pseudo-Rayleigh wave is seen moving in various layers of the laminated formation 160.

In one aspect, in a laminated formation with its preferentially horizontally aligned cross-bedding and micro-cracking (as suggested in FIG. 2), the shear compliance is different in the two principal directions: vertical and horizontal. Those skilled in the art of acoustics may recognize this description refers to a subset of the stiffness matrix elements of an anisotropic elastic medium—the so-called $C_{ij}$'s. In such a layer, the wave particle motion is believed to experience these two shear compliances such that over a long-enough propagation distance the injected compact acoustic wavepacket splits into two parts with the slower part connected to the direction along which the compliance is higher. This wave particle motion may be aligned with the low elliptical motion major axis.

In one embodiment, splitting of an acquired signal is employed as an indication of a lamination at the inch or sub-inch scale (i.e., near and below the spatial resolution of the standard ultrasonic measurement of an ultrasonic pitch-catch tool). More specifically, the time delay between the early- and later-arriving events comprising the pseudo-Rayleigh surface wave, as well as the difference in frequency content of the two events may be used to provide valuable information on a shale laminate's intrinsic microstructure and on other thinly laminated formations.

Figure 3A:
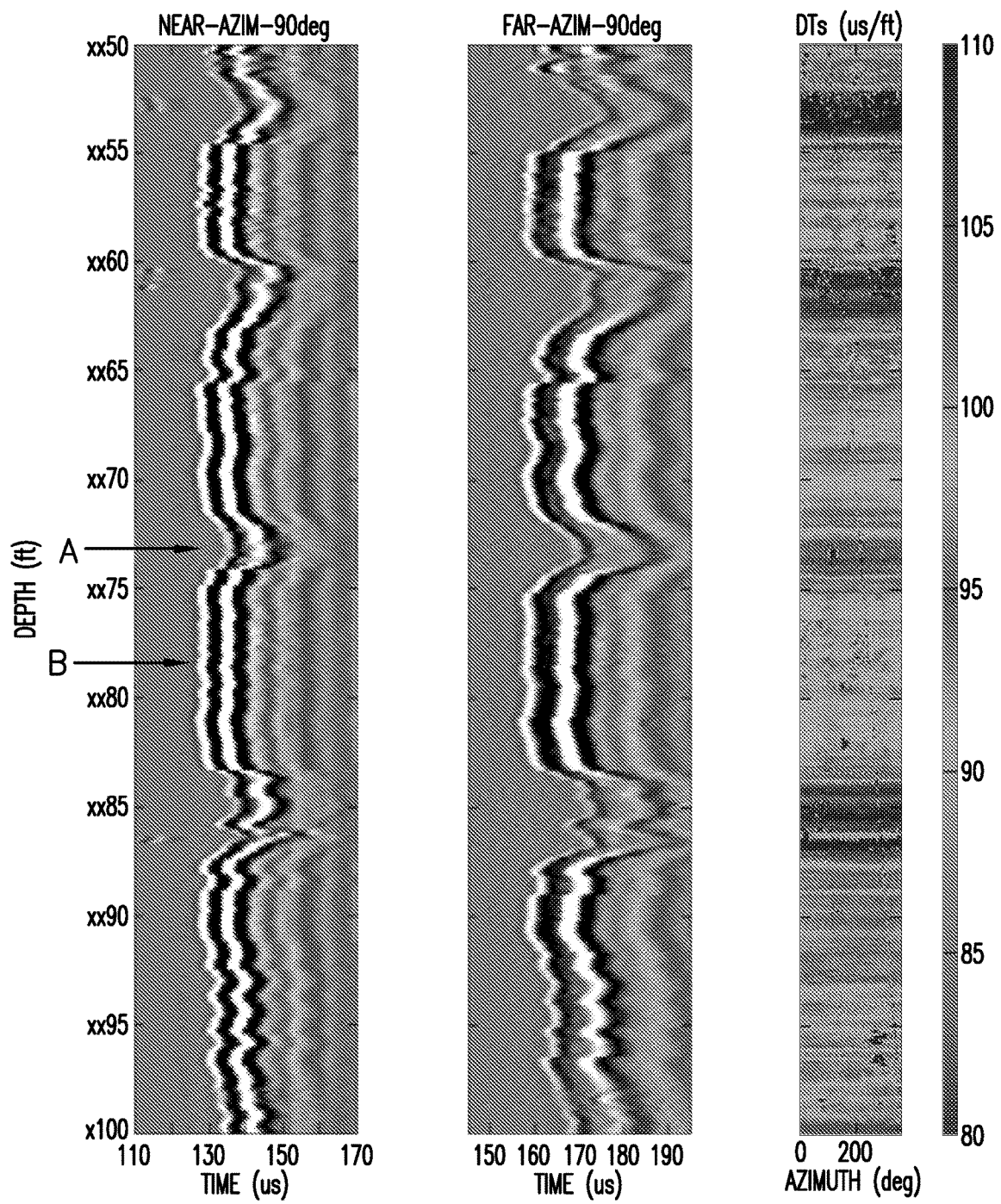
FIG. 3a shows, in three tracks from left to right and along a fifty foot interval of a borehole, raw data for a single azimuth of the ultrasonic tool for a near detector, raw data for a single azimuth of the ultrasonic tool for a far detector, and a slowness image as a function of azimuth generated from the data obtained from the ultrasonic tool.
Figure 3B:
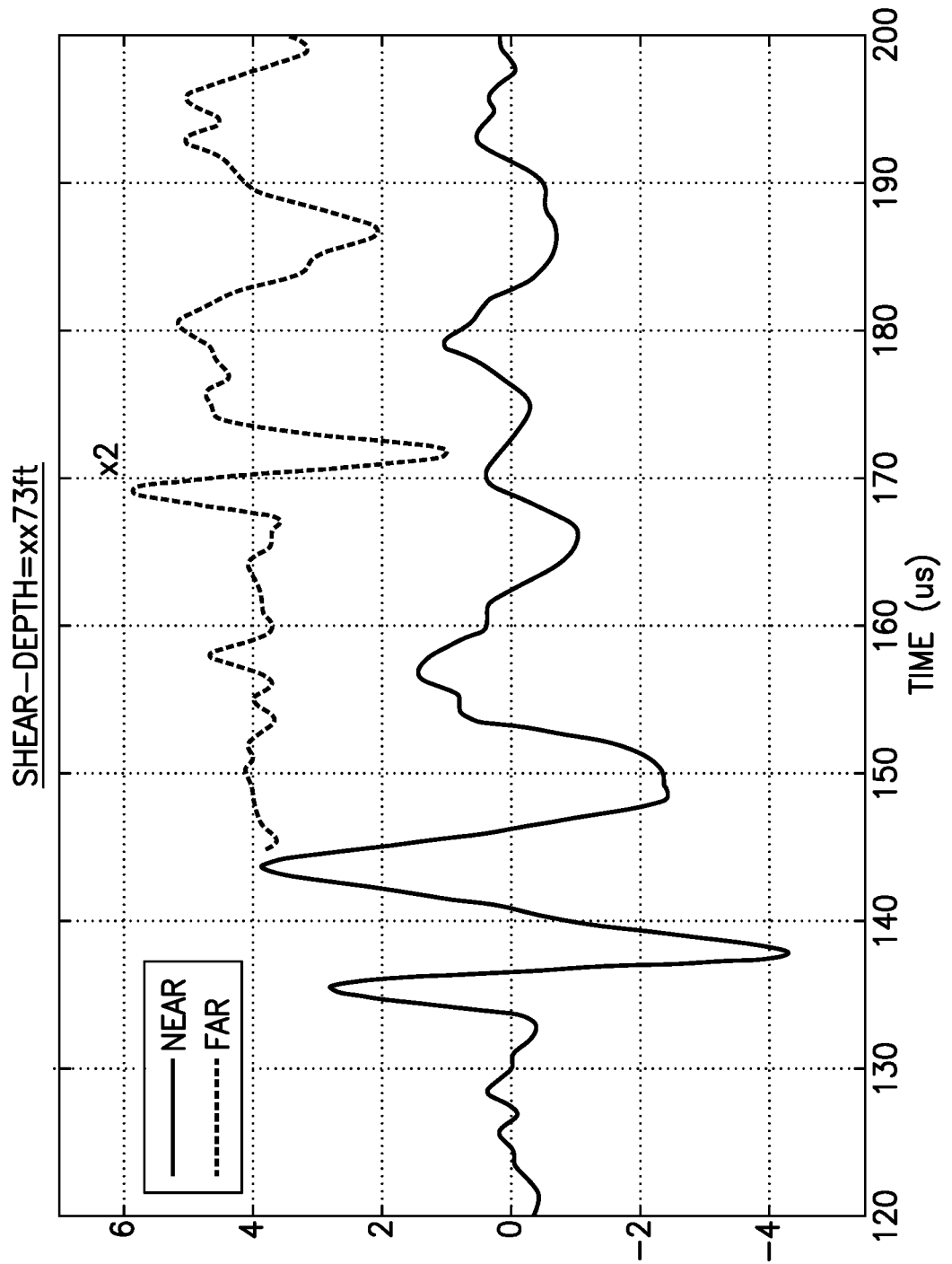
FIG. 3b shows the pseudo-S signal at the depth A (shale layer) indicated in FIG. 3a for the near and far detectors, with signal splitting evident in at least the far detector signal.
Figure 3C:
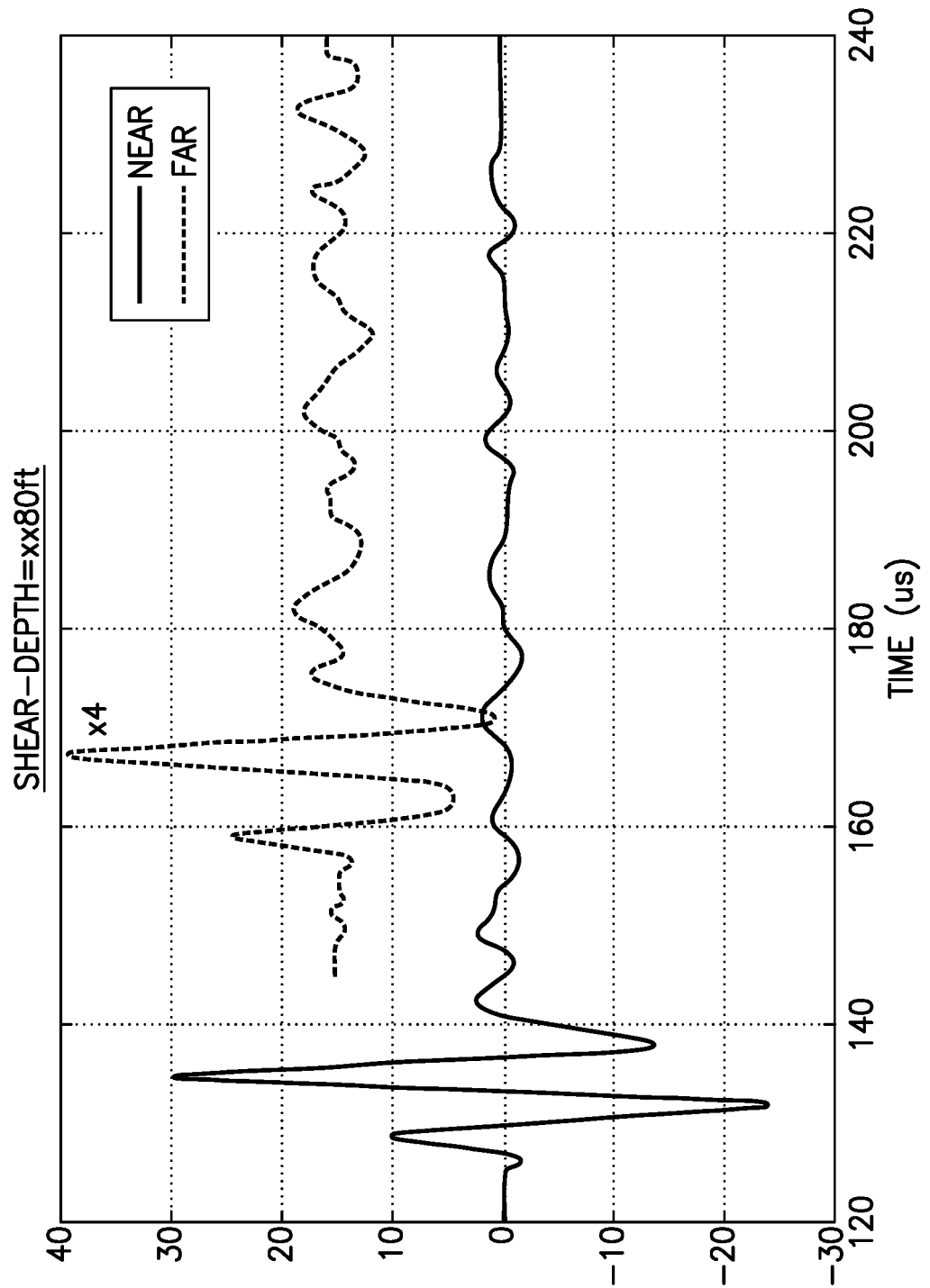
FIG. 3c shows the pseudo-S signal at the depth B (sand layer) indicated in FIG. 3a for the near and far detectors, with no signal splitting evident.

The recording and analysis of the splitting of an acquired acoustic signal is seen with reference to FIGS. 3a, 3b and 3c. In particular, a raw variable density log (VDL) data obtained along a fifty foot length of a borehole from a "Near" detector and a "Far" detector of an ultrasonic tool are seen respectively in the left and middle tracks of FIG. 3a. The raw data in both tracks are presented for a single azimuth (90 degrees). In addition, in the right track of FIG. 3a, a slowness image as a function of azimuth generated from the data obtained from the ultrasonic tool is shown with a key to slowness values adjacent thereto. It is noted that the dark bands at depths xx52-xx55 feet, xx61-xx63 feet, xx73-xx75 feet, xx84-xx88 feet, and xx99-xx100 feet are indicative of higher slownesses (e.g., about 100-110 μs/ft).

Pseudo-Rayleigh surface waveforms (also referred herein as pseudo-shear waveforms) obtained at the near and far detectors at depths A and B of FIG. 3a are seen in FIGS. 3b and 3c respectively. FIG. 3b shows the pseudo-S signal at a shale layer at depth A (xx73 feet). The near signal reveals a generally compact signal which generally appears to be a single signal, although a slight inflection at about between 140 and 141 μs might be indicative of the onset of splitting of the signal. On the other hand, the far signal reveals separate compact signals (a clear splitting of the received signal). This indicates that the rock located at depth A is laminated at the inch or sub-inch scale and may present planes and/or interfaces of weakness for hydraulic fracturing. In turn, this lamination may lead to height containment of vertical fractures induced during a completion job which may lead to a reduction in stimulated volume within the formation. Further, the lamination may lead to reducing the connectivity of the fractured areas once the hydraulic fracturing has ceased. In addition, the magnitude of the time delay between the split signals may be related to the extent of the mechanical weakness of the corresponding planes and/or interfaces. The weakness may be related to quantities such as interfacial sliding friction, internal friction, and internal unconfined compressive stress (UCS). In FIG. 3b, the time delay may be considered the delay between the onset of the first compact sine wave at about 168 µs and the onset of the second compact sine wave at about 177 µs (i.e. a delay of 9 µs).

Turning now to FIG. 3c, the pseudo-S signal at the depth B (sand or carbonate layer) indicated in FIG. 3a is seen for the near and far detectors. In FIG. 3c, neither the near nor the far detector signals suggest a splitting of the signal. In other words, neither the near nor the far detector appears to be recording more than one event. Thus, it can be concluded that the rock located at depth B is likely not to be laminated at the inch or sub-inch scale and not to present planes and/or interfaces of weakness for hydraulic fracturing.

FIG. 4 is similar to FIG. 3a but along a twenty-five foot interval of another zone in the same borehole. The left and middle tracks provide raw data for a single azimuth of the ultrasonic tool for a near detector and for a far detector respectively, while the right track provides a slowness image as a function of azimuth generated from the data obtained from the ultrasonic tool with a slowness key adjacent thereto. It is noted that the dark bands at depths xx52-xx54 feet, xx58-xx61 feet, xx64-xx66 feet, and xx70-xx72 feet are indicative of higher slownesses (e.g., about 103-110 µs/ft).

Figure 4A:
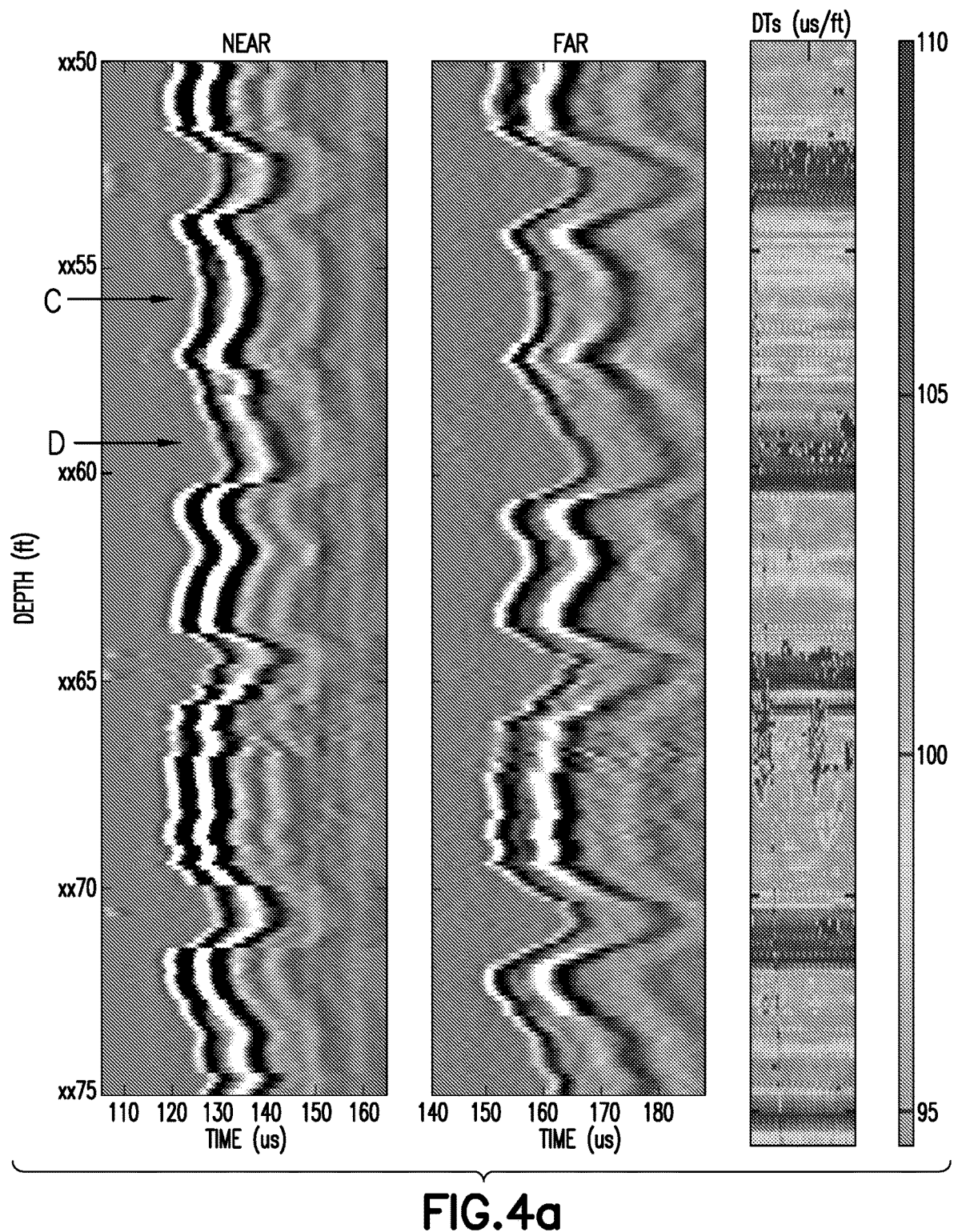
FIG. 4a shows, in three tracks from left to right and along a twenty-five foot interval of another zone in the same borehole, (i) raw data for a single azimuth of the ultrasonic tool for a near detector, (ii) raw data for a single azimuth of the ultrasonic tool for a far detector, and (iii) a slowness image as a function of azimuth generated from the data obtained from the ultrasonic tool.
Figure 4B:
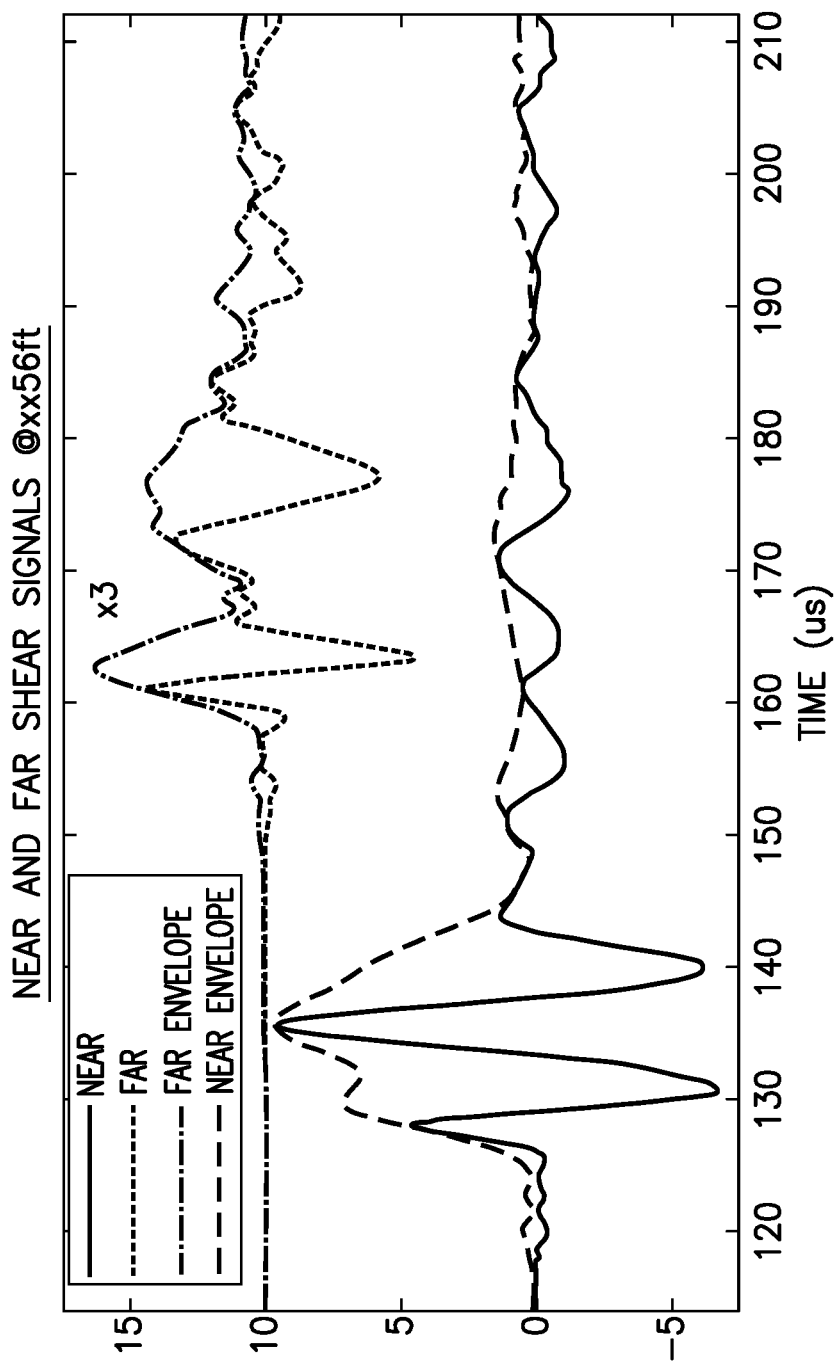
FIG. 4b shows the pseudo-S signal at the depth C (shaly-sand layer) indicated in FIG. 4a for the near and far detectors and with waveform envelopes plotted.
Figure 4C:
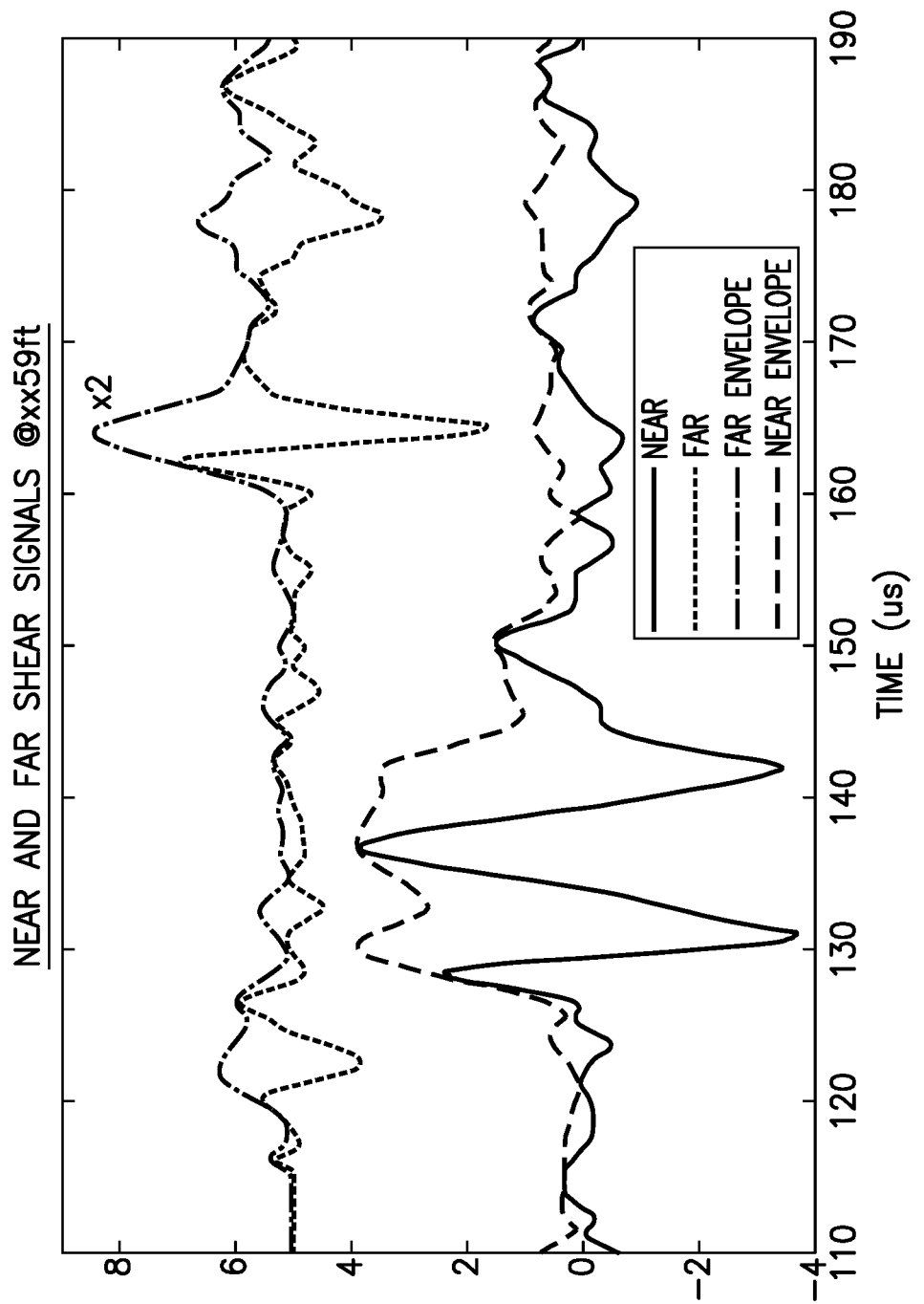
FIG. 4c shows the pseudo-S signal at depth D (shale layer) indicated in FIG. 4a for the near and far detectors and with waveform envelopes plotted.

FIG. 4b shows the pseudo-S signal at the depth C (shaly-sand or shaly-carbonate layer) indicated in FIG. 4a for the near and far detectors and with waveform envelopes plotted, while FIG. 4c shows the pseudo-S signal at the depth D (shale layer) indicated in FIG. 4a for the near and far detectors and with waveform envelopes plotted. In both FIGS. 4b and 4c, the far receiver shows a clear splitting of the signal indicative of two events. The two events are also evident from the waveform envelopes plotted in FIGS. 4b and 4c. In both FIGS. 4b and 4c, the near receiver signals appear to have inflection points (at about 132 and 133 µs) that suggest the onset of signal splitting in both cases. The waveform envelopes have dips that more clearly suggest the onset of signal splitting at those times. In one aspect, it is assumed that the propagation distance in the rock related to the near receiver may not be long enough to allow for significant splitting that is evident in the waveforms detected by the far receiver. Processing techniques such as deconvolution of the transmitter source signal may be utilized to temporally sharpen the signals and accentuate the indication of splitting.

It will be appreciated that in FIG. 4b, the signal envelope for the far receiver shows peaks at approximately 163 and 175 µs, whereas in FIG. 4c, the signal envelope for the far receiver shows peaks at approximately 164 and 178 µs. Thus, the time delay in FIG. 4b is approximately 12 µs whereas the time delay in FIG. 4c is approximately 14 µs. In one embodiment, the larger time delay is considered as indicating increased mechanical weakness of the plane and/or interface.

In some cases, the waveforms may not exhibit clear signal splitting with two distinct events. The waveforms may be elongated and include a plurality of events (e.g., peaks). For example, the waveforms may include a sinusoid. Such features are also indicative of lamination present at the inch or sub-inch scale.

Figure 5:
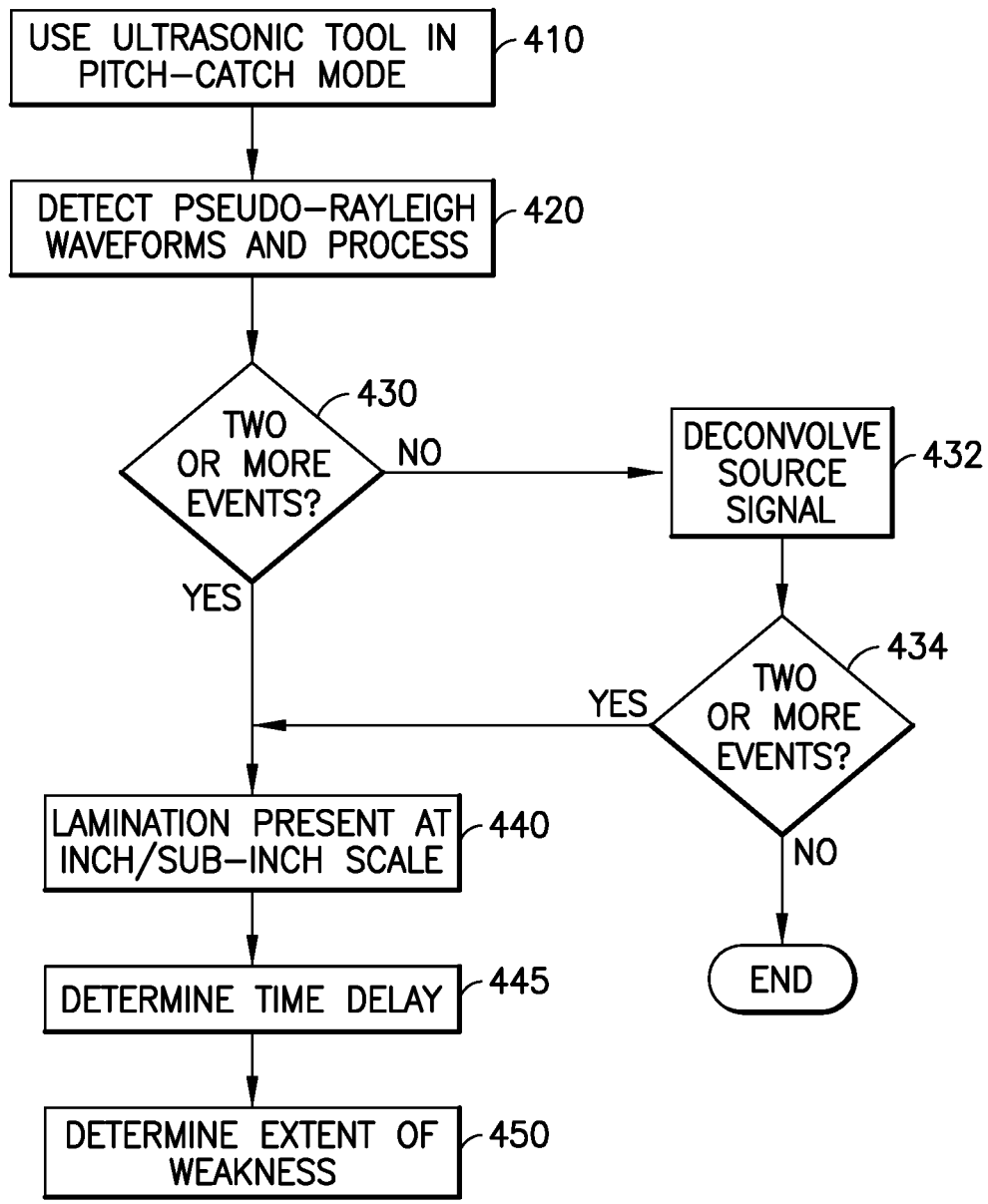
FIG. 5 is a flow-chart of a method for identifying a bedding planes of weakness in a formation based on the presence of signal splitting.

FIG. 5 is a flow-chart of a method for identifying a bedding plane of weakness in a formation based on the presence of signal splitting. At 410, an ultrasonic borehole tool is used in a pitch-catch mode in an uncased borehole traversing a formation in order to excite and detect pseudo-Rayleigh surface wave waveforms in the borehole. The ultrasonic borehole tool may include a plurality of detectors spaced from a transducer. At 420, the detected pseudo-Rayleigh waveforms are processed in order to determine at 430 whether or not two events are represented. In one embodiment, if splitting is not immediately seen, the processing includes deconvoluting the received signal at 432 and checking at 434 to see whether two pulses are present. In another embodiment, processing includes generating signal envelopes and detecting whether more than one peak is present. In yet another embodiment, processing includes generating the spectral amplitudes associated with the waveforms and detecting whether a spectral notch reflecting the existence of two interfering events is present. If two events are present (e.g., the received signal suggests a split in the signal), it is concluded at 440 that the investigated rock is laminated at the inch or sub-inch scale. As a result, it may also be concluded that the rock may present a plane and/or interface of weakness for hydraulic fracturing. In one embodiment, if it is determined at 430 that two events are present, the time delay between the two events is determined at 445. The time delay may then be used at 450 to indicate the extent of mechanical weakness of the plane and/or interface of weakness with increased delay indicating increased weakness.

In one aspect, information obtained at 440 and/or 450 regarding the location(s) of the lamination of the rock, and, if desired, the extent of mechanical weakness at that location or locations may be provided to a model of the formation in order to more completely define aspects of the formation. In turn, the formation model may be used in planning fracturing details, horizontal well placement, production estimates, etc., and may impact the implementation of fracturing and production.

As suggested from FIGS. 3a, 3b, 3c, and 4a, 4b, and 4c, the splitting is observed in the waveforms when a significant differential in the vertical versus horizontal shear compliance is experienced by the pseudo-Rayleigh surface wave and an adequate propagation distance is present (as is the case for the waveforms of the far receiver that arise from the larger propagation distance in the rock relative to the near receiver waveforms).

Figure 6:
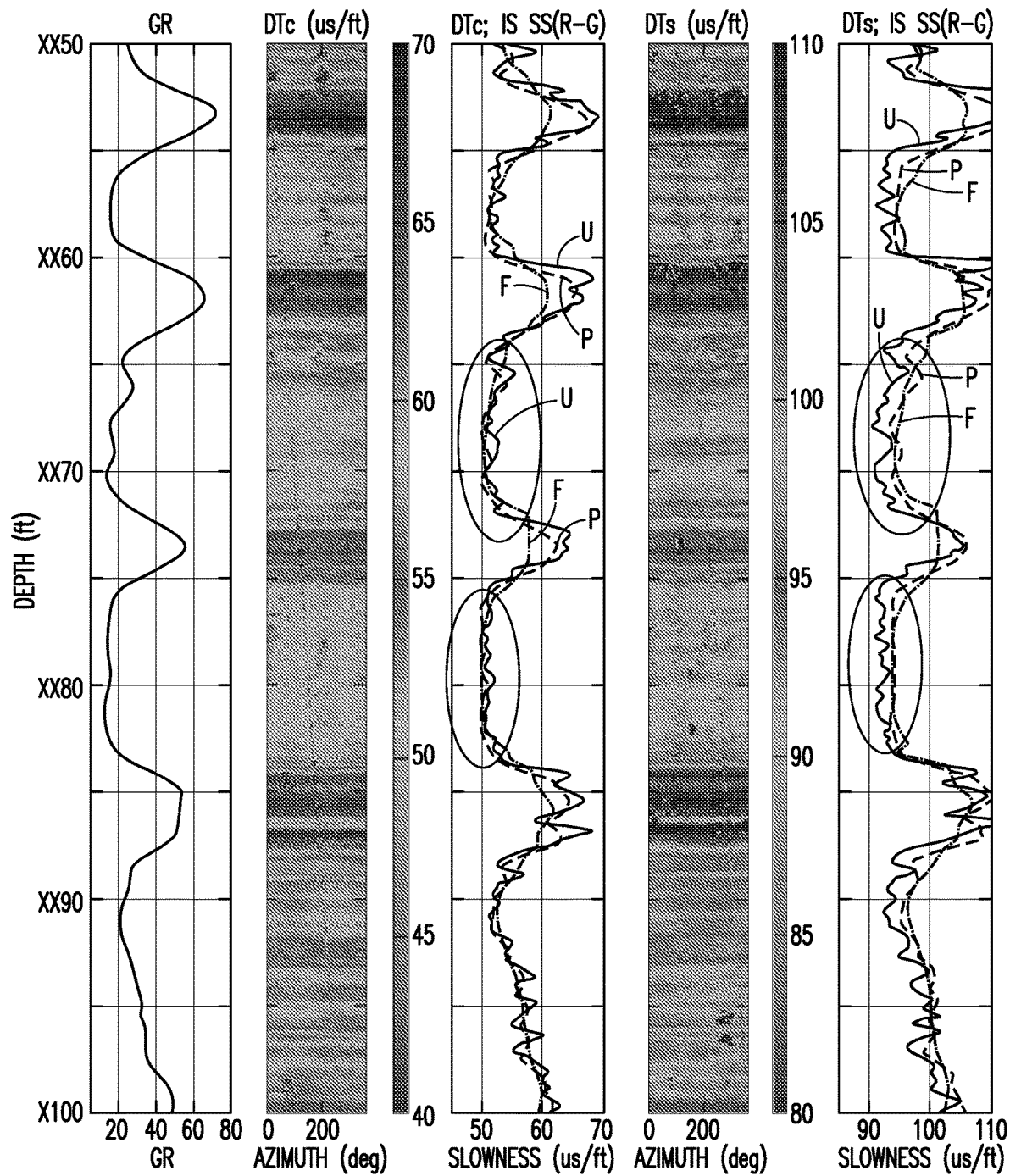
FIG. 6 shows, in five tracks from left to right, (i) a gamma ray log, (ii) a P-wave slowness image as a function of azimuth generated from data obtained from the ultrasonic tool, (iii) logs of P-wave slowness from the ultrasonic tool and from a sonic tool, (iv) an S-wave slowness image, and (v) logs of pseudo-S-wave slowness from the ultrasonic tool and S-wave slownesses from sonic tool.

When the differential in vertical and horizontal compliance is not pronounced enough for the splitting to be directly observed in the waveforms (as is the case for the stiff intervals having lower slownesses), according to another embodiment, another attribute may be utilized to locate formation layering. In particular, in order to locate laminated layers on the inch or sub-inch scale which may exhibit a plane and/or interface of weakness for hydraulic fracturing, the estimated pseudo-Rayleigh wave slowness may be compared to the true shear slowness of the rock. The latter can be estimated, e.g., with a sonic monopole measurement exciting a pure shear headwave. FIG. 6 shows results that illustrate this approach.

FIG. 6 shows the same depth interval of the same borehole analyzed in FIG. 3a, but with plots in several tracks: (i) a gamma ray log to the left, (ii) a P slowness image in the second left-most track, (iii) a comparison between the ultrasonic tool P slowness log and two P slowness logs obtained from a sonic tool in the third (middle) track, (iv) an S slowness image in the second right-most track, and (v) a comparison between the ultrasonic tool pseudo-S slowness log and two S slowness logs obtained from a sonic tool in the right-most track. The slowness logs from the sonic tool are estimated from processing the waveforms with a Slowness-Time-Coherence (STC) approach for the full thirteen-receiver array located along six feet of Schlumberger's SonicScanner tool (the results indicated in the middle and right-most track by F) and for a three-receiver sub-array located along one foot of the tool (the results indicated in the middle and right-most track by P). The slowness log from the ultrasonic tool (indicated in the middle and right-most track by U) is an azimuthal average of the slowness image. As will be appreciated, in the thick layers, the P slowness logs of the sonic tool and ultrasonic slowness log agree with each other as seen in the ovals marked in the middle track. Examples of thick layers include nearly 10-foot carbonate or sand layers shown having P slownesses in the range of 48-53 µs/ft and having S slowness of between 92 and 93 µs/ft in the slowness images. When located in these thick layers, the large 6-foot receiver aperture of the sonic tool does not average out the large contrast in slowness between the compliant and stiff lithologies that are observed elsewhere in this formation. However, while the S slowness logs associated with the full- and sub-arrays of the sonic tool agree with each other, they do not agree with the S (actually pseudo-S) slowness of the ultrasonic slowness log as highlighted with the ovals in the right-most track. Indeed, the ultrasonic S slowness is actually associated with the pseudo-Rayleigh surface wave slowness, and is consistently smaller than the true shear slownesses as measured by the sonic tool. By way of hypothesis (and not by way of limitation), it is believed that the pseudo-Rayleigh surface wave propagates in a laminated rock at the inch and sub-inch scale that leads it to split, with the earliest event being faster than the shear wave. See Chang C-H. et al., "Experimental observation of surface wave propagation for a transversely isotropic medium," Geophysics, Vol. 60(1), pp. 185-190 (1995), and Lim T. C. and Farell G. W., "Character of pseudo surface waves on anisotropic crystals," J. Acoust. Soc. Am. 45, pp. 845-851 (1968).

In one embodiment, the difference in slownesses between shear (and pseudo-shear) wave slownesses derived from the ultrasonic and sonic tools may be considered related to an indication of the level of mechanical weakness of the plane and/or interface. In particular, the difference in slowness may be related to values of mechanical properties $C_{ij}$. The difference in shear (pseudo-shear) velocities may similarly be considered as related to an indication of the level of mechanical weakness of the plane and/or interface.

Figure 7:
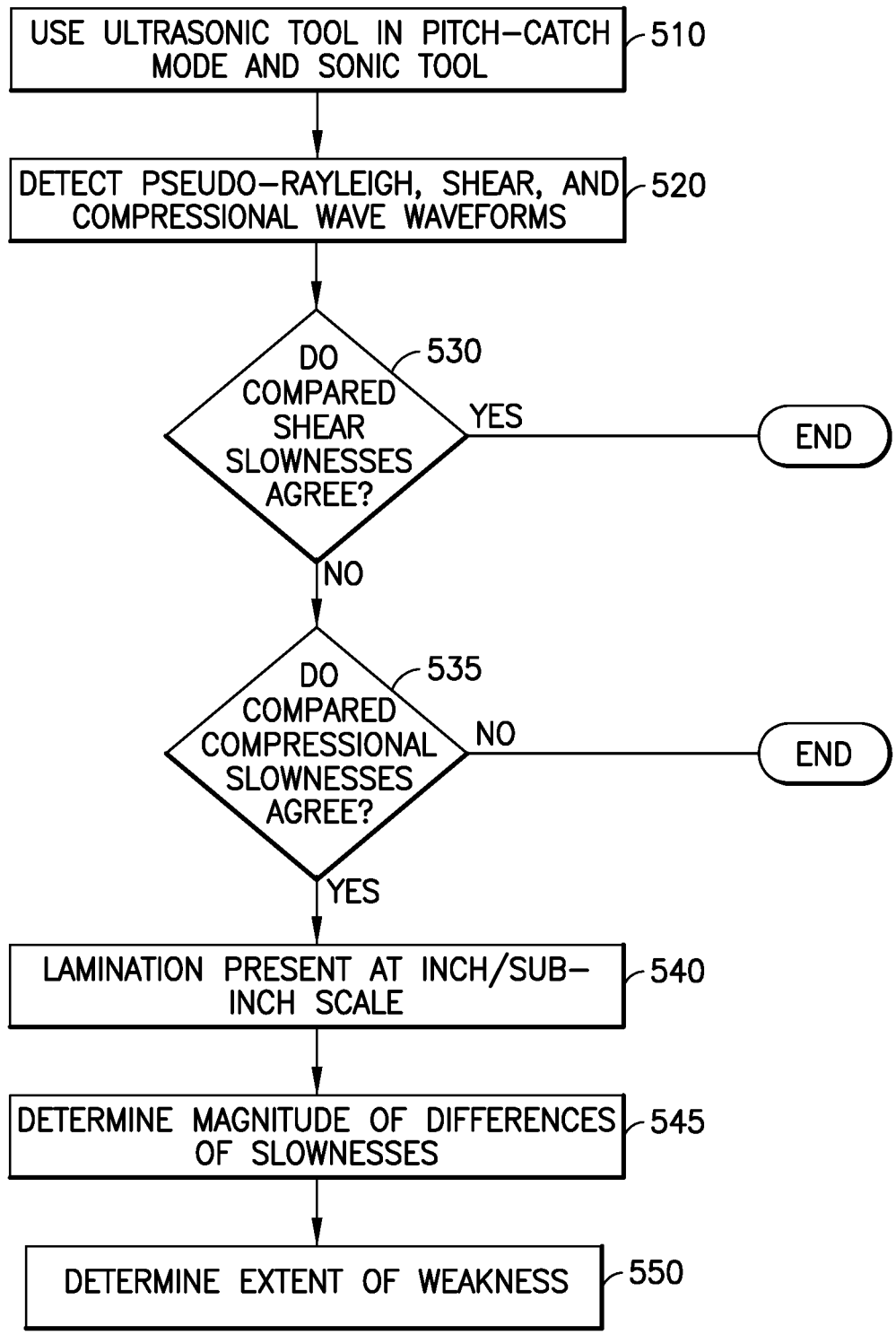
FIG. 7 is a flow-chart of a method for identifying a bedding plane of weakness in a formation based on the differences in indications of velocity obtained by sonic and ultrasonic tools.

FIG. 7 is a flow-chart of a method for identifying a bedding plane of weakness in a formation based on the presence of signal splitting. At 510, an ultrasonic borehole tool is used in a pitch-catch mode in an uncased borehole traversing a formation in order to excite and detect pseudo-Rayleigh surface wave and compressional wave waveforms in the borehole. In addition, a sonic borehole tool is run in the same borehole in order to excite and detect shear and compressional wave waveforms. At 520, the detected pseudo-Rayleigh wave waveforms from the ultrasonic tool and the detected shear and compressional wave waveforms from the sonic tool are processed. In one embodiment, the sonic tool waveforms are processed using STC-type processing (e.g., STC, Dispersive Slowness-Time-Coherence (DSTC), or other). At 530 the slownesses of the sonic and ultrasonic tools are compared. If the ultrasonic pseudo-S and the sonic shear slownesses do not agree (530), while the compressional slownesses agree (535), it is concluded at 540 that the investigated rock is laminated at the inch or sub-inch scale. As a result, it may also be concluded that the rock presents a plane and/or interface of weakness for hydraulic fracturing. In one embodiment, if it is determined at 530 that the shear (pseudo-shear) slownesses do not agree, the magnitude of the difference between the slownesses is determined at 545. The magnitude of the slowness difference may then be used at 550 to indicate the extent of mechanical weakness of the plane and/or interface of weakness. In one embodiment, instead of using slownesses, the shear (pseudo-shear) velocities may be compared, it being appreciated that the slowness is the inverse of the velocity.

In one aspect, information obtained at 540 and/or 550 regarding the location(s) of the lamination of the rock, and, if desired, the extent of mechanical weakness at that location or locations may be provided to a model of the formation in order to more completely define aspects of the formation. In turn, the formation model may be used in planning fracturing details, location of horizontal wells, production estimates, etc., and may impact the implementation of fracturing and production.

Methods for providing evidence of inch and sub-inch scale lamination in certain depth intervals have already been described in conjunction with FIGS. 3a, 3b, 3c, 4a, 4b, 4c and 5, and in conjunction with FIGS. 6 and 7. However, where results from a sonic tool are not available, the methods of FIGS. 6 and 7 may not be implementable. In addition, where the pseudo-S waveforms do not show splitting, the methods of FIGS. 3a, 3b, 3c, 4a, 4b, 4c and 5 may not be available to locate planes or interfaces of highly-contrasted rock compliance, if present. However, in one embodiment, micro-resistivity images, and in particular, micro-resistivity images that have been modified for amplitude dynamic range may be utilized to locate planes or interfaces of highly-contrasted rock compliance, if present. The resistivity images may be visually contrasted and/or quantitatively correlated with slowness images generated from the ultrasonic borehole tool results.

Figure 8A:
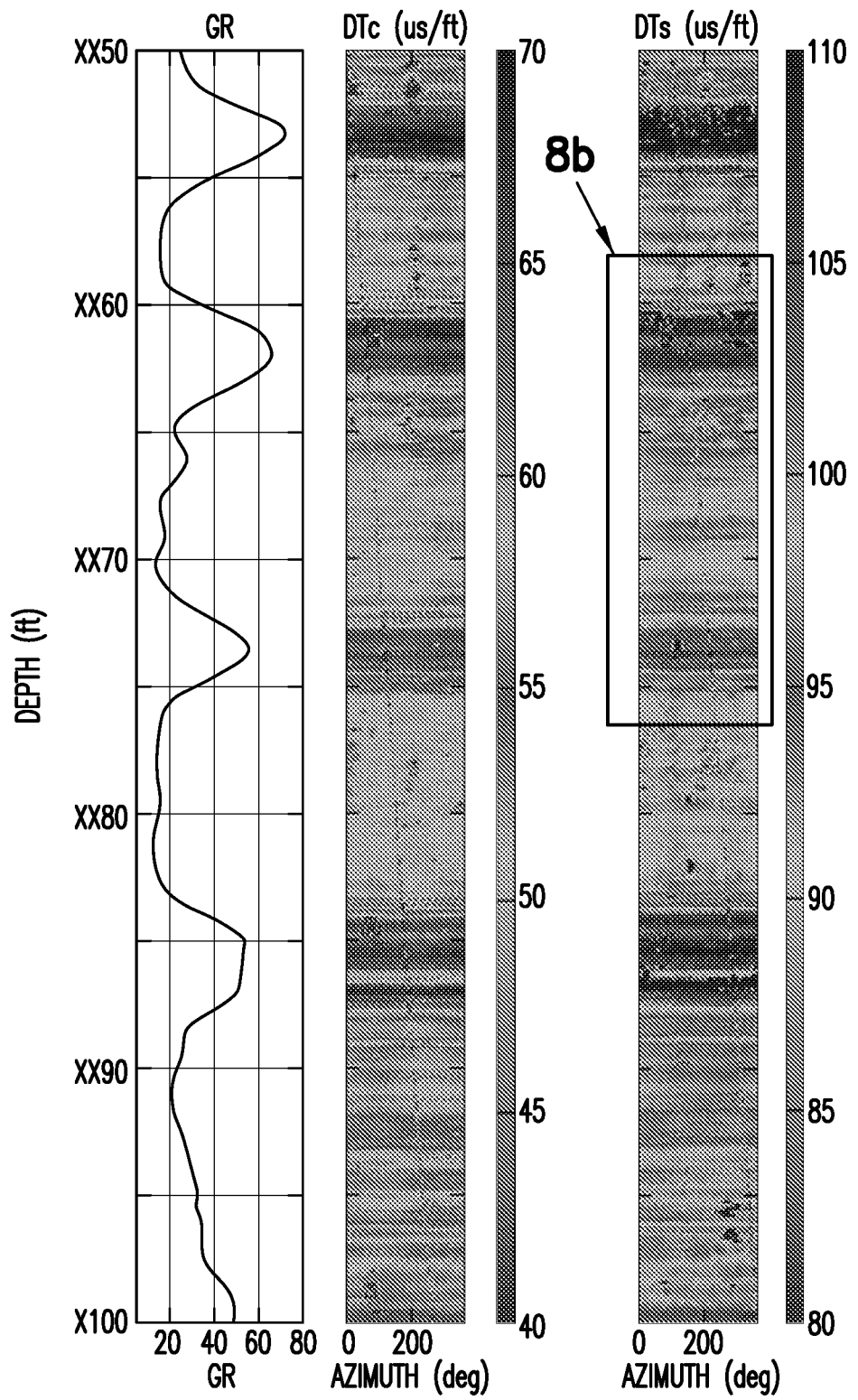
FIG. 8a shows, in three tracks from left to right, a gamma ray log and the P-wave and S-wave slowness images shown in FIG. 6.
Figure 8B:
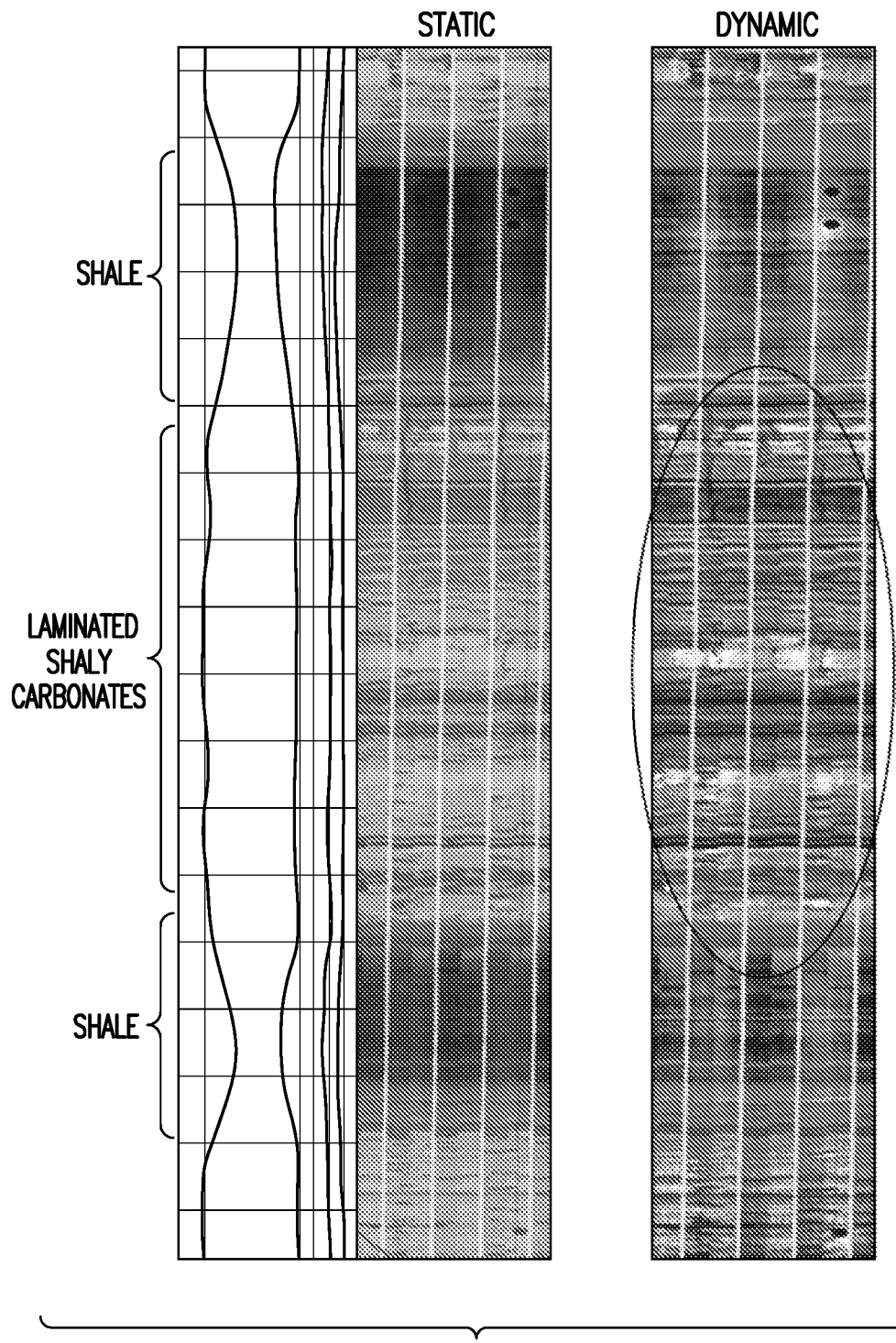
FIG. 8b shows a microresistivity image with a static amplitude scale for a portion of the borehole indicated in the S-wave slowness image of FIG. 8a, and a microresistivity image modified for dynamic amplitude scale for the same portion of the borehole.

Turning now to FIGS. 8a and 8b, logs and images are shown for the same depths in the same borehole discussed above with reference to FIG. 6. In FIGS. 8a and 8b, information obtained from an ultrasonic tool is used in conjunction with information obtained from a micro-resistivity tool such as the Fullbore Micro-resistivity Imager (FMI) (a trademark of Schlumberger) or the oil-based mud imager, Quanta Geo (a trademark of Schlumberger). More particularly, in FIG. 8a, the left-most track (gamma ray), the second left-most track (compressional slowness image as a function of azimuth) and the third left-most track (pseudo-shear slowness image as a function of azimuth) are exactly the same as the left-most track, the second left-most track, and the second right-most track of FIG. 6. The second right-most track in FIG. 8b is a microresistivity image for the indicated portion (depth xx57-xx77 ft) of the borehole indicated in the pseudo-S-wave slowness image, and the right-most track in FIG. 8b is the microresistivity image of the second right-most track modified for dynamic range.

It can be seen in FIGS. 8*a* and *b* that the static image of the FMI (second right-most track) provides a first-order detection and discrimination scheme of the more compliant layers corresponding to high conductivity (and likely to be provided by water bound to the shale grains, and made of shales or siltstones). These layers (at intervals xx60-xx63 ft and xx73-xx75 ft) sandwich a thick layer of several feet (between xx63-xx74 ft) that appears to have low conductivity on the FMI and low slowness on the ultrasonic images.

Within the layer between xx63-xx74 ft, which appears much less compliant with relatively low P and (pseudo-) S slownesses, inspection of the dynamic image of the FMI in the right-most track of FIG. 8*b* reveals thin beds with high conductivity likely to be of a shaly nature. While this lamination introduces an anisotropy in the vertical and horizontal compliances of this layer with a contrast that is not pronounced enough for the splitting of the pseudo-Rayleigh surface wave to be directly observed (see FIG. 3*b*), it has already established that lamination is present by having compared the transit time of the pseudo-Rayleigh surface wave fast event to the true shear slowness estimated from a sonic tool (as per FIGS. 6 and 7 discussed above). Thus, in one embodiment, an FMI image may be used in lieu of a comparison of sonic and ultrasonic shear (pseudo-S) wave slownesses in order to identify thin beds on the inch to sub-inch scale that present a plane and/or interface of weakness for hydraulic fracturing in rock intervals where no splitting of the pseudo-Rayleigh signal is present.

Figure 9:
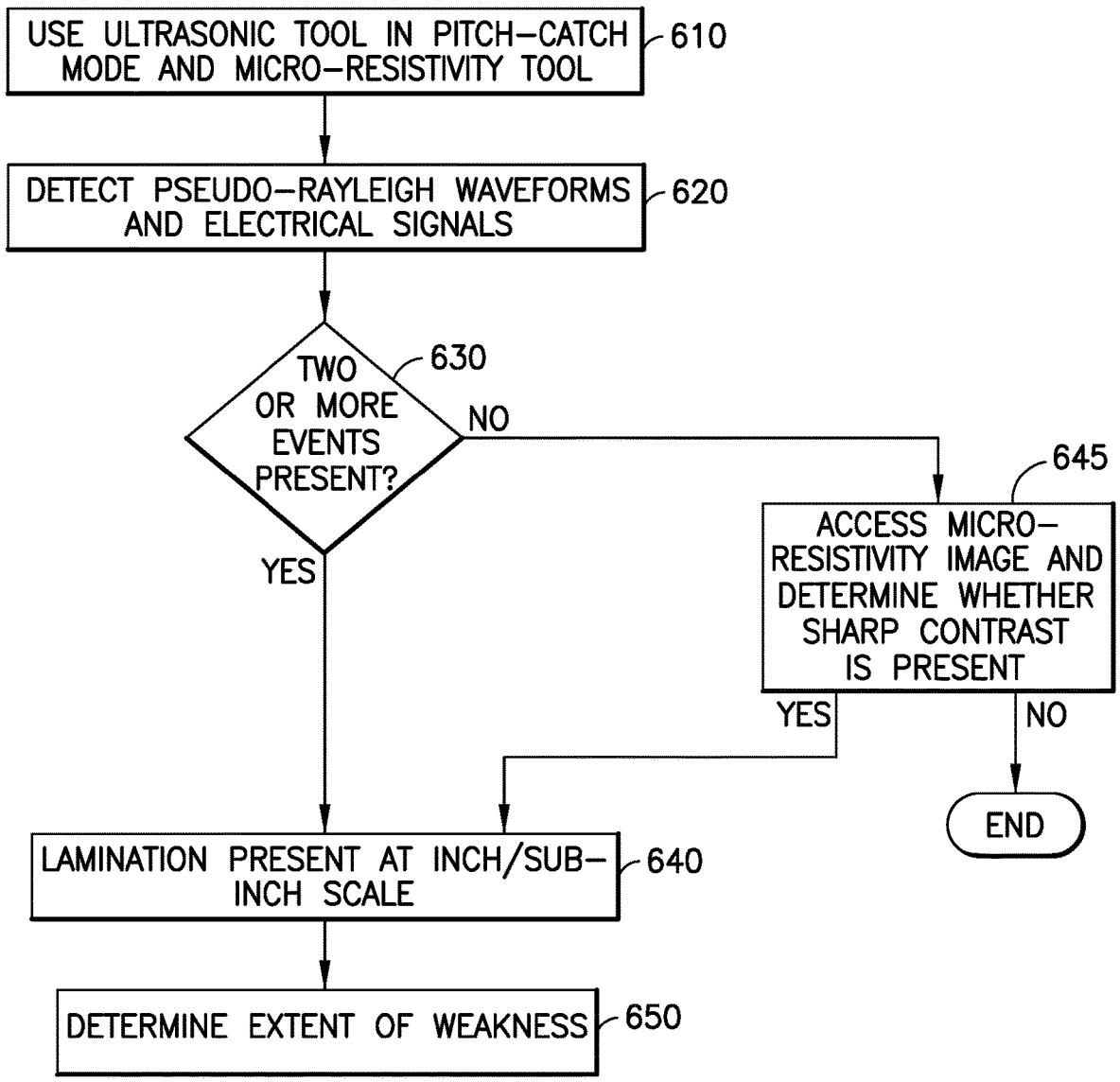
FIG. 9 is a flow-chart of a method for identifying a bedding plane of weakness in a formation based on the contrast in indications of velocity images and resistivity images obtained by ultrasonic and microresistivity tools.

FIG. 9 is a flow-chart of a method for identifying a bedding plane of weakness in a formation based on the differences in indications of velocity obtained by ultrasonic and microresistivity tools. At 610, an ultrasonic borehole tool is used in a pitch-catch mode in an uncased borehole traversing a formation in order to excite and detect pseudo-Rayleigh surface wave waveforms in the borehole. The ultrasonic borehole tool may include a plurality of detectors spaced from a transducer. In addition, a micro-resistivity tool with multiple electrodes is run in the same borehole in order to acquire electrical signals. At 620, the electrical signals from the electrodes are processed in order to generate a micro-resistivity image. In addition, the detected pseudo-Rayleigh waveforms are processed in order to determine at 630 whether or not two events are represented. If two events are present (e.g., the received signal suggests a split in the signal), it is concluded at 640 that the investigated rock is laminated at the inch or sub-inch scale as discussed above with reference to FIG. 5. However, if two events are not present at a given depth, at 645, the micro-resistivity image is accessed in order to locate lamination as indicated by a sharp contrast in resistivity. If desired, the micro-resistivity image may be enhanced using a dynamic scale in order to better locate a lamination. In one embodiment, if it is determined at 645 that lamination is present, the contrast in resistivity is used at 650 to indicate the extent of mechanical weakness of the plane and/or interface of weakness.

In one aspect, information obtained at 640 and/or at 650 regarding the location(s) of the lamination of the rock, and, if desired, the extent of mechanical weakness at that location or locations may be provided to a model of the formation in order to more completely define aspects of the formation. In turn, the formation model may be used in planning fracturing details, location of horizontal wells, production estimates, etc., and may impact the implementation of fracturing, location of horizontal wells, and production.

In one aspect, some of the methods and processes described above, such as the processing of signals detected by ultrasonic receivers, signals detected by sonic receivers, and signals detected by an electrode array are performed by a processing system. The term "processing system" should not be construed to limit the embodiments disclosed herein to any particular device type or system. The processing system may include a computer system. The computer system may also include a computer processor (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims.

What is claimed is:

1. A method of investigating a formation traversed by a borehole, the method comprising:
   exciting and detecting pseudo-Rayleigh surface wave waveforms at a plurality of locations in the borehole using an ultrasonic borehole tool that includes an ultrasonic transmitter and at least one ultrasonic receiver in a pitch-catch mode;
   determining at each of the plurality of locations in the borehole whether at least two events are represented in the pseudo-Rayleigh wave waveforms.

2. The method of claim 1, further comprising:
   if at least two events are represented at a particular location of the plurality of locations, identifying the particular location as a location of interfacial weakness in the formation.

3. The method of claim 2, further comprising:
   determining a time delay between the at least two events; and associating a magnitude of the time delay with an extent of weakness.

4. The method of claim 3, wherein the determining includes generating a signal envelope having at least two peaks, wherein the time delay is a delay between the at least two peaks in the envelope.

5. The method of claim 1, wherein the at least one ultrasonic receiver comprises a near ultrasonic receiver and a far ultrasonic receiver, wherein the near ultrasonic receiver and the far ultrasonic receiver are spaced at different distances from the ultrasonic transmitter.

6. The method of claim 5, wherein the determining comprises using deconvolution to process the pseudo-Rayleigh wave waveforms from the near ultrasonic receiver.

7. The method of claim 5, wherein the determining comprises using spectral amplitude estimation to process the pseudo-Rayleigh wave waveforms from the near ultrasonic receiver.

8. The method of claim 5, wherein the detecting includes determining that a signal is comprised of a plurality of sinusoids.

9. The method of claim 1, further comprising:
exciting and detecting sonic shear wave waveforms and sonic compressional wave waveforms at the plurality of locations in the borehole using a sonic borehole tool that includes a sonic source and a plurality of sonic wave detectors;
exciting and detecting ultrasonic compressional wave waveforms at the plurality of locations in the borehole using the ultrasonic borehole tool;
determining shear wave slowness at the plurality of locations in the borehole using the sonic shear wave waveforms;
determining sonic compressional wave slowness at the plurality of locations in the borehole using the sonic compressional wave waveforms;
determining pseudo-shear wave slowness at the plurality of locations in the borehole using the pseudo-Rayleigh wave waveforms;
determining ultrasonic compressional wave slowness at the plurality of locations in the borehole using the ultrasonic compressional wave waveforms;
at each of the plurality of locations, comparing the shear wave slowness with the pseudo-shear wave slowness; and
at each of the plurality of locations, comparing the sonic compressional wave slowness with the ultrasonic compressional wave slowness.

10. The method of claim 9, further comprising:
if (i) the shear wave slowness and the pseudo-shear wave slowness are different and (ii) the sonic compressional wave slowness and the ultrasonic compressional wave slowness agree at a particular of the plurality of locations, identifying the particular location as a location of interfacial weakness in the formation.

11. The method of claim 10, further comprising:
determining a difference between the shear wave slowness and the pseudo-shear wave slowness; and
associating a magnitude of the difference with an extent of interfacial weakness.

12. The method of claim 1, further comprising:
imaging the borehole at the plurality of locations using a microresistivity borehole scanner tool that includes an array of electrodes;
processing signals from the array of electrodes to generate an image of the borehole at the plurality of locations in the borehole;

if at least two events are not represented for any particular location, using the microresistivity image to identify whether that location presents a sharp contrast in resistivity relative to adjacent locations, and if so, identifying the particular location as a location of interfacial weakness in the formation.

13. The method of claim 12, wherein the processing signals from the array of electrodes to generate an image of the borehole at the plurality of locations comprises generating the image using a dynamic scale.

14. A method of investigating a formation traversed by a borehole, the method comprising:
exciting and detecting sonic shear wave waveforms and sonic compressional wave waveforms at a plurality of locations in the borehole using a sonic borehole tool that includes a sonic source and a plurality of sonic wave detectors;
exciting and detecting pseudo-Rayleigh surface wave waveforms and ultrasonic compressional wave waveforms at the plurality of locations in the borehole using an ultrasonic borehole tool that includes an ultrasonic transmitter and at least one ultrasonic receiver in a pitch-catch mode;
determining shear wave slowness at the plurality of locations in the borehole using the sonic shear wave waveforms;
determining sonic compressional wave slowness at the plurality of locations in the borehole using the sonic compressional wave waveforms;
determining pseudo-shear wave slowness at the plurality of locations in the borehole using the pseudo-Rayleigh wave waveforms;
determining ultrasonic compressional wave slowness at the plurality of locations in the borehole using the ultrasonic compressional wave waveforms;
at each of the plurality of locations, comparing the shear wave slowness with the pseudo-shear wave slowness;
at each of the plurality of locations, comparing the sonic compressional wave slowness with the ultrasonic compressional wave slowness; and
if (i) the shear wave slowness and the pseudo-shear wave slowness are different and (ii) the sonic compressional wave slowness and the ultrasonic compressional wave slowness agree at a particular location of the plurality of locations, identifying the particular location as a location of interfacial weakness in the formation.

15. The method of claim 14, further comprising:
determining a difference between the shear wave slowness and the pseudo-shear wave slowness; and
associating a magnitude of the difference with an extent of interfacial weakness.

16. A method of investigating a formation traversed by a borehole, the method comprising:
exciting and detecting pseudo-Rayleigh surface wave waveforms at a plurality of locations in the borehole using an ultrasonic borehole tool that includes an ultrasonic transmitter and at least one ultrasonic receiver in a pitch-catch mode;
imaging the borehole at the plurality of locations using a microresistivity borehole scanner tool that includes an array of electrodes;
processing signals from the array of electrodes to generate an image of the borehole at the plurality of locations in the borehole;
determining at each of the plurality of locations in the borehole whether at least two events are represented in the pseudo-Rayleigh wave waveforms; and if at least two events are not represented for a particular location of the plurality of locations, using the micro-resistivity image to identify whether the particular location presents a sharp contrast in resistivity relative to adjacent locations.

17. The method of claim 16, further comprising:
if a sharp contrast in resistivity is present, identifying the particular location as a location of interfacial weakness in the formation.

18. The method according to claim 17, wherein the processing signals from the array of electrodes to generate an image of the borehole at the plurality of locations comprises generating the image using a dynamic scale.

19. A system for investigating a formation traversed by a borehole, the system comprising:
   an ultrasonic logging tool comprising an ultrasonic transmitter and at least one ultrasonic receiver in a pitch-catch mode, wherein the ultrasonic logging tool is configured to excite and detect pseudo-Rayleigh surface wave waveforms at a plurality of locations in the borehole; and
   a processing system configured to determine at each of the plurality of locations in the borehole whether at least two events are represented in the pseudo-Rayleigh wave waveforms.

20. The system of claim 19, wherein the processing system is further configured to identify a particular location of the plurality of locations as a location of interfacial weakness in the formation if at least two events are represented at the particular location.

* * * * *